United States Patent [19]
Biegelsen et al.

[11] Patent Number: 6,120,002
[45] Date of Patent: Sep. 19, 2000

[54] FLUID VALVES HAVING CANTILEVERED BLOCKING FILMS

[75] Inventors: David K. Biegelsen, Portola Valley; Warren B. Jackson, San Francisco; Patrick C. P. Cheung, Oakland, all of Calif.

[73] Assignee: Xerox Corporation, Stamford, Conn.

[21] Appl. No.: 09/481,234

[22] Filed: Jan. 11, 2000

Related U.S. Application Data

[62] Division of application No. 09/004,639, Jan. 8, 1998.

[51] Int. Cl.[7] .................................................. F16K 31/02
[52] U.S. Cl. ........................................ 251/129.01; 216/2
[58] Field of Search ........................ 251/129.01, 129.02; 137/82; 216/2

[56] References Cited

U.S. PATENT DOCUMENTS

| | | | |
|---|---|---|---|
| 5,441,597 | 8/1995 | Bonne et al. | 216/2 |
| 5,804,514 | 9/1998 | Kwon | 216/2 |
| 5,981,304 | 11/1999 | Perrin et al. | 216/2 |

*Primary Examiner*—Kevin Shaver
*Assistant Examiner*—Eric Keasel

[57] ABSTRACT

A cantilever valve useful for paper handling applications is disclosed. The valve can be batch fabricated in two dimensional valve arrays, with each valve in the array being controlled by passive matrix addressing. Typically, each valve includes a valve housing having an aperture plate defining an aperture therethrough, and an opposing port plate positioned in spaced apart relationship to the aperture plate. A flexible film or strip is attached at its first end between the aperture and port plates and is unattached so that it is free to move between the aperture and port plates at its second end. Valve action is provided by use of a single switching electrode for moving the flexible film between an aperture blocking position and an aperture open position, with the switching electrodes positioned adjacent to the port plate.

5 Claims, 6 Drawing Sheets

FLUID VALVES HAVING CANTILEVERED BLOCKING FILMS

This application is a divisional of application Ser. No. 09/004,639, filed Jan. 8, 1998.

FIELD OF THE INVENTION

The present invention relates to electronically addressable cantilevered valves suitable for controlling fluid flow. More specifically, the present invention relates to an addressable array of valves for controlling air jet operation, with particular utility for paper handling applications.

BACKGROUND AND SUMMARY OF THE INVENTION

High speed electronic control of fluid flow using inexpensive batch fabricated valve arrays is potentially critical for numerous applications, including distributed actuator controls, paper or object positioning, dynamic control of fluid instabilities, or microcontrol of microchemical reactions and biological assays. Other potential applications include use of valves to drive physical elements that support tactile displays or other virtual reality interface tools. However, large two dimensional arrays of microvalves (e.g. 100×100 valves or more) can be difficult and expensive to construct to the necessary tolerances, and reliable addressing of specific valves to open or close on a millisecond time scale is often not feasible.

The present invention provides a novel valve capable of being arranged in two dimensional valve arrays allowing millisecond time response and high throughput of the aggregate array and the ability to control flow with large pressure differentials. Moreover each valve in the array is capable of control by passive or active matrix addressing. In a preferred embodiment, each valve includes a valve housing having an aperture plate defining an aperture therethrough, and an opposing plate positioned in spaced apart relationship to the aperture plate. A flexible electrically conductive film or strip is attached at its first end to the aperture or opposing plate and is free to move between the plates at its second end. Valve action is provided by use of at least one switching electrode for moving the flexible film between an aperture open position and an aperture blocking position. A dielectric layer between the flexible conductive film and the switching electrode prevents shorting.

In preferred embodiments, various valve modifications can be employed to enhance valve operation, minimize power requirements, and increase valve switching times. For example, instead of a circular or elliptical aperture cross section, the aperture can be defined to have at least one acute vertex, providing a point release for air inflow or outflow. The flexible film does not have to be a straight, homogenous strip, but can be varied in composition, width, thickness, and stiffness along its length. In other configurations, electrode size, positioning, and geometry can be varied. Electrode modifications, and other mechanical modifications to the flexible film, allow for tuning valve response time, decreasing or increasing valve pressure strengths, and varying electrostatic interactions.

Advantageously, valves of the present invention can be arranged into large passively addressable arrays. Such arrays include a plurality of valves, with each valve defining an aperture therethrough, and a plurality of flexible films respectively attached to each of the plurality of valves, with each flexible film independently addressable to alternately switch between an aperture blocking position and an aperture open position. A switching voltage source is used to maintain a subset of the plurality of valves at either a non-switching voltage or a switching voltage. When switching electrodes are activated for applying an electrostatic switching force to move the plurality of flexible films, only that subset of the plurality of valves having flexible films maintained at the switch voltage transition between the aperture blocking position and an aperture open position. In practice, usually two address lines connected to each valve in a valve array are required. Opposing switching electrodes are respectively addressed at one of two possible voltage differences, high (e.g. positive or negative 100 volts) or low (0 volts). To switch the film from a blocking to a non-blocking position, or vice versa, it is necessary to switch the voltages. In the non-blocking voltage state fluid pressure forces the free end of the flexible strip away from the blocking position. When a particular valve in a two dimensional row and column array is to be switched, the voltage difference applied to all flexible strips in a particular row (or column) is changed from an intermediate voltage (e.g. 50 volts) to a switching voltage. Ordinarily, only that valve at the intersection of the row (or column) and column (or row) of opposing electrodes actually switches, with the others valves addressed in the array remaining unchanged. Of course, by appropriate row and column multiplexing, multiple switching in parallel is possible.

In a preferred embodiment, the use of independently addressable valves allows for high spatial precision transport of objects, including flexible objects such as paper. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper. Fortunately, mechanical or frictional engagement is only one possible means for moving an object. Object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by valve controlled air jets. This is particularly advantageous, for example, when sheets of paper carrying unfixed toner images must be moved between a photoconductive drum and a fusing station where the toner image is fixed. With conventional physical rollers, the continuing possibility of dynamic distortions to the toner image, or even slight misalignments resulting in image degradation, must always be considered.

Accordingly, the present invention provides a fluid transport apparatus and method for moving a flexible object that does not require physical contact. The present invention can effectively work with either continuous or discrete flexible objects moving through a materials processing system. A fluid pressure source is connected to a plurality of valves, with each valve defining an aperture therethrough, and having a plurality of flexible films respectively attached, with each flexible film independently addressable to alternately switch between an aperture blocking position and an aperture open position.

An S-wave valve is described in U.S. Ser. No. 08/711,229, "Passively Addressable Fluid Valves Having S-Shaped Blocking Films", is assigned to the same assignee as the present invention and is hereby incorporated by reference.

The S-Wave valve structure requires a flexible membrane which spans from the bottom to top of a rectangular shaped cavity, or cavity with a topologically similar cross section. The length of the membrane must therefore be longer than the diagonal of the rectangle. Controlling the extra length in a batch fabrication process is difficult. The S-wave valve also utilizes two actuation electrodes, a top and a bottom electrode. A cantilever valve structure for closure of a pressurized air stream needs only one electrode and can be fabricated using a simpler planar technology. Furthermore, length control is not an issue. The cantilever structure maintains the high conductance of the full S-wave and shares the minimal electrostatic gap of both S-wave and cantilever valves.

Additional functions, objects, advantages, and features of the present invention will become apparent from consideration of the following description and drawings of preferred embodiments.

DETAILED DESCRIPTION OF THE INVENTION

Figure 1:
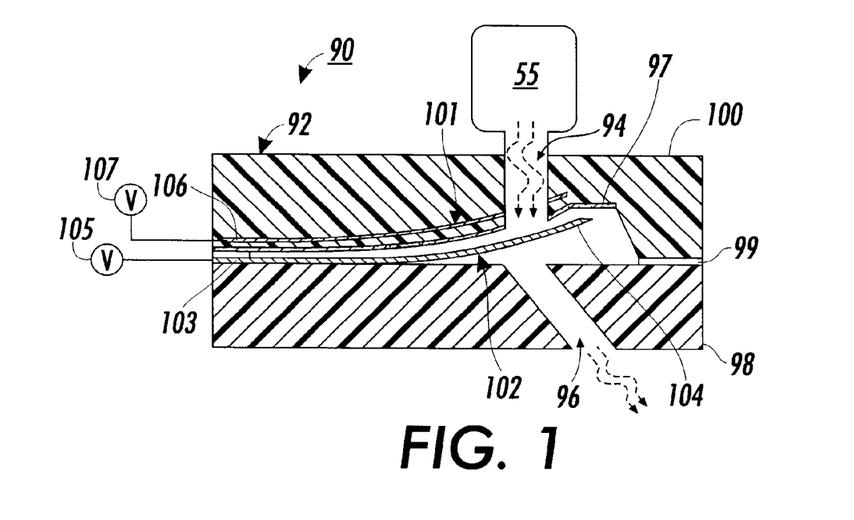
FIG. 1 is a side cross sectional view of the valve in accordance with the present invention showing the film moving from an aperture blocking position to a non-blocking position.

A valve 90 according to one embodiment of the present invention is illustrated in a side cross sectional view in FIG. 1. The valve 90 includes a valve housing 92 that defines a port 94 and an aperture 96 for inlet or outlet of fluid. In the illustrated embodiment the port 94 is best configured as a selectively blockable inlet port for pressurized air, while the aperture 96 is an air outlet. However, as those skilled in the art will appreciate, inlets and outlets can be reversed or repositioned as necessary for best operation.

The valve housing 92 is formed from an aperture plate 98 (defining the aperture 96) and an opposing port plate 100 positioned in spaced apart parallel relationship to the aperture plate 98. Port plate 100 has a curved surface 101. In the illustrated embodiment, plates 98 and 100 are separately formed as distinct layers that are later bonded together with adhesive layer 99, however, it is of course possible to use micromachining, plastic deposition, or other techniques to form unitary structures.

A flexible film 102 is sandwiched between the plates 98 and 100. As illustrated, the film 102 has a fixed film end 103 pinned in position between plates 98 and 100, while an unfixed film end 104 is free to move between plates 98 and 100.

Flexible film 102 is at least in part conductive so that a voltage can be applied to reliably switch the flexible film between an aperture blocking position in which port 94 is blocked and an aperture open position in which port 94 is unblocked, and vice-versa. Electrode 106 is attached to electrode voltage source 107 in plate 100 with dielectric layer 97 formed thereon. Of course, a flexible dielectric layer can be alternatively incorporated as part of flexible film 102. The electrode is a switching electrode that pulls the unfixed film end 104 toward plate 100 when a switching voltage is applied by voltage source 107 between film 102 and electrode 106. Film voltage source 105 is attached to film fixed end 103 and is used when the valve is part of an addressable array.

Figure 2:
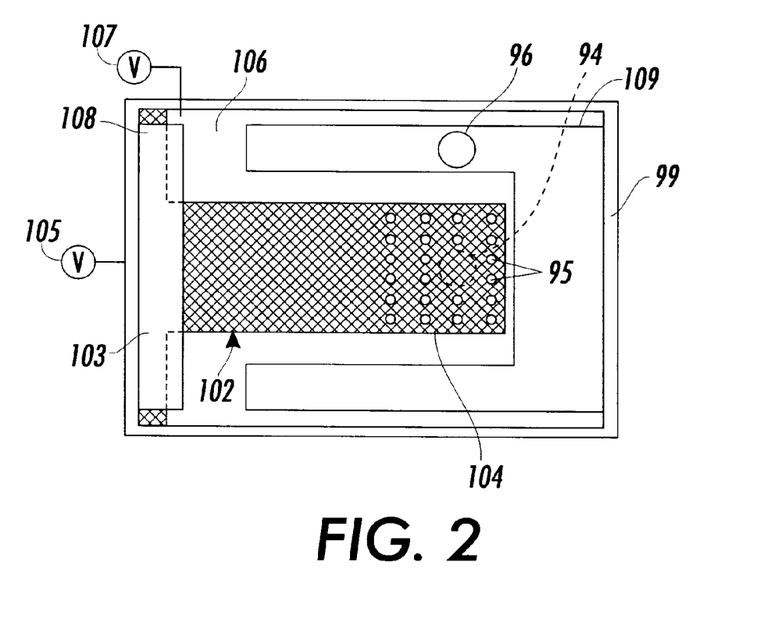
FIG. 2 is a top view of the valve of FIG. 1, with a top aperture plate removed to better illustrate positioning of the film with respect to the port.

FIG. 2 is a top view of the valve shown in FIG. 1. The relative positions of port 94 and aperture 96 in the valve are shown as being offset from one another, however may be positioned in any manner desired. In this view, optional openings 95 in film 102 are clearly seen. Openings 95 result in reducing the elastic stiffness of the film and reducing the air resistance encountered both during film motion and clamping/declamping of the film to the electrode 106. The solid area of the film may be built-up with holes, for example, by patterned deposition or plating. Alternatively, the holes may be formed substractively after the formation of the film, for example by photolithography or stamping. A desirable hole diameter is approximately one tenth the diameter of the port 94 to keep the impedance for air flow relatively low. A column address line 108 and a row address line 109 are used when the valve is incorporated in a passive array as discussed below with respect to FIG. 6. Column address line 108 is associated with film voltage source 105 which is attached to the flexible film and row address line 109 is associated with electrode voltage source 107.

Valve 90 can be constructed with a variety of machining or micromachining techniques, including those associated with conventional integrated circuit or printed circuit board fabrication. For example, chemical etching, electron beam lithography, photolithography, or other standard integrated circuit batch processing technologies can be used to define necessary air conduits, control or circuitry conduits, holes, orifices, and apertures. Alternatively, injection molding, high precision numerically controlled machines, or stereolithography can be employed for low cost batch construction of valves. Materials used in construction may include plastics, metals, glasses, or ceramics. In one possible embodiment, plastics, epoxies, glass, silicon, polysilicon, silicon nitride, silicon, silicon oxide, oxynitride, plastics or aluminum, or any other available material suitable for lithographic processing can be used to define the necessary valve housing, valve structures, or conduits. Electrodes can be any conductive metal or polymer, while the flexible film can be constructed from plastic films, aluminum coated mylar, plated nickel, or polyimide sandwiched aluminum. In typical applications, the housing of each valve will be less than 100 cubic millimeters in volume (10×10×1 millimeters), while the flexible film in the valve housing will generally have dimension on the order of 0.1 to 10 millimeters in width, 0.5 to 50 millimeters in length, and 1 to 10 microns in thickness. Large arrays of the valves can be constructed, with meter scale arrays having tens of thousands of individual valves being contemplated.

Figure 3:
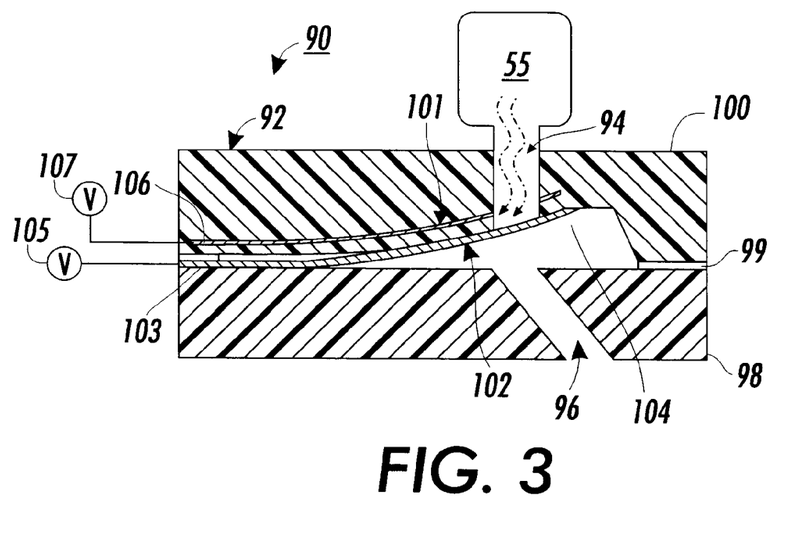
FIG. 3 is a side cross sectional view of the valve of FIGS. 1 and 2, with the film shown in an aperture blocking position.

A particular process for fabricating the cantilever valve shown in FIGS. 1–3 includes producing an aperture substrate (plastic, glass, metal, FR4, etc), for example by injection molding to include an array of apertures, depositing and patterning an optional release layer on the aperture substrate, and depositing or electroless plating a metal membrane and then patterning it into column address lines and cantilever films. The cantilever films may optionally be formed with holes as discussed in reference to FIG. 2. A port substrate is produced in a manner similar to the aperture substrate, with depositing and patterning metal to form the rows address lines and electrodes and then depositing a dielectric insulation layer, such as parylene over the electrode. The relatively large lateral feature dimensions compared with the height of the port allows non-planar photolithographic patterning with a suitably large depth of focus. An adhesive layer is applied to either the substrate or top layer and the aperture substrate and port substrate are aligned (optically or with pins) and pressure bonded together. The membrane release layer is removed. This can optionally be followed by a treatment to form a hydrophobic layer to reduce water adsorption and stiction.

Operation of valve 90 is best discussed in connection with FIGS. 3 and 4. As seen in FIG. 3, a fluid pressure source 55 is connected to the valve. The fluid pressure source can be provided by a fan, a vacuum source a pressurized air source, or any other conventional device suitable for modifying available fluid pressure. When the fluid pressure source is a vacuum source, it is applied at port 96 in the particular valve configuration shown. The fluid (typically filtered air) pressure source enters valve 90 and exits through aperture 96, unless port 94 is blocked by film 102, as seen in cross section in FIG. 3. Electrode 106 is connected to electrode voltage source 107. The unfixed film end 104 is moved towards port plate 100 and pulled into its blocking position when voltage 107 is increased to the switching voltage. Electrostatic closure is facilitated by the continuous close proximity of the translating portion of the film and electrode 106.

Figure 4:
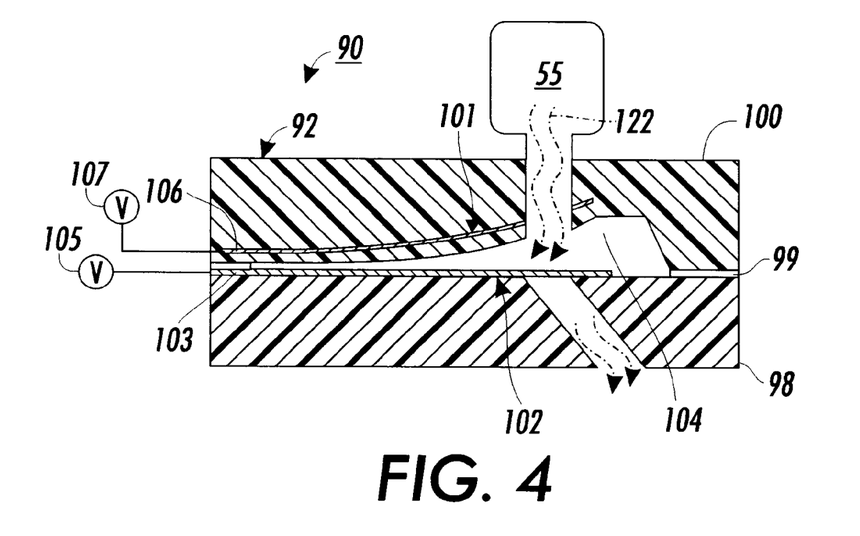
FIG. 4 is a side cross sectional view of the valve of FIGS. 1 and 2, with the film in an aperture non-blocking position.

To move the film to an unblocked aperture position as seen in FIG. 4, voltage source 107 is reduced to a voltage below the voltage which will hold the unfixed film end 104 against port 94. When the film is electrostatically released, port 94 is blown open which results in an aperture open condition. This allows air flow to occur in a relatively large volume, thereby providing high air conductance through the valve. Movement of the unfixed film end is encouraged by the inflow of pressurized fluid (air) through port 94.

Figure 5:
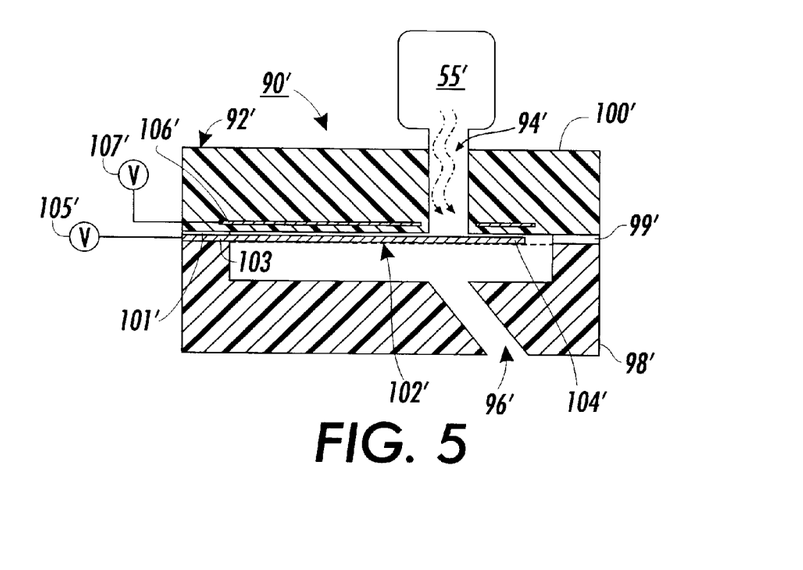
FIG. 5 is a side cross sectional view of another embodiment of the valve.

Alternative film structures and designs are also contemplated to be within the scope of the present invention. For example, FIG. 5 illustrates a valve 90', which is similar to the valve of FIGS. 1–4, with like components being similarly numbered. However, rather than having a gently curving port plate inner surface 101, port plate 100' in FIG. 5, has a relatively flat, straight port plate inner surface 101', which provides for easier fabrication of the flat film. A dielectric layer 97' is formed on flexible film 102'. The dielectric layer need only be formed on the portion of the flexible film which comes into contact with electrode 106' to prevent shorting between the film and electrode.

One process for fabricating the cantilever valve shown in FIG. 5 includes producing an aperture substrate (plastic, glass, metal, FR4, etc), for example injection molding to include an array of apertures, filling the aperture substrate with a thick cast polymer layer and planarizing the polymer layer and depositing or electroless plating a metal membrane and then patterning it into address lines and cantilever films with optional openings. The cast polymer is then sacrificially removed. In the embodiment shown in, the dielectric layer, such as parylene is then conformably deposited on the cantilever films. A port substrate is produced in a manner similar to the aperture substrate, with depositing and patterning metal to form the electrodes, an optional additional dielectric insulation layer (not shown) may then be deposited. An adhesive layer is applied to either the substrate or top layer and the aperture substrate and port substrate are aligned (optically or with pins) and pressure bonded together.

Figure 6:
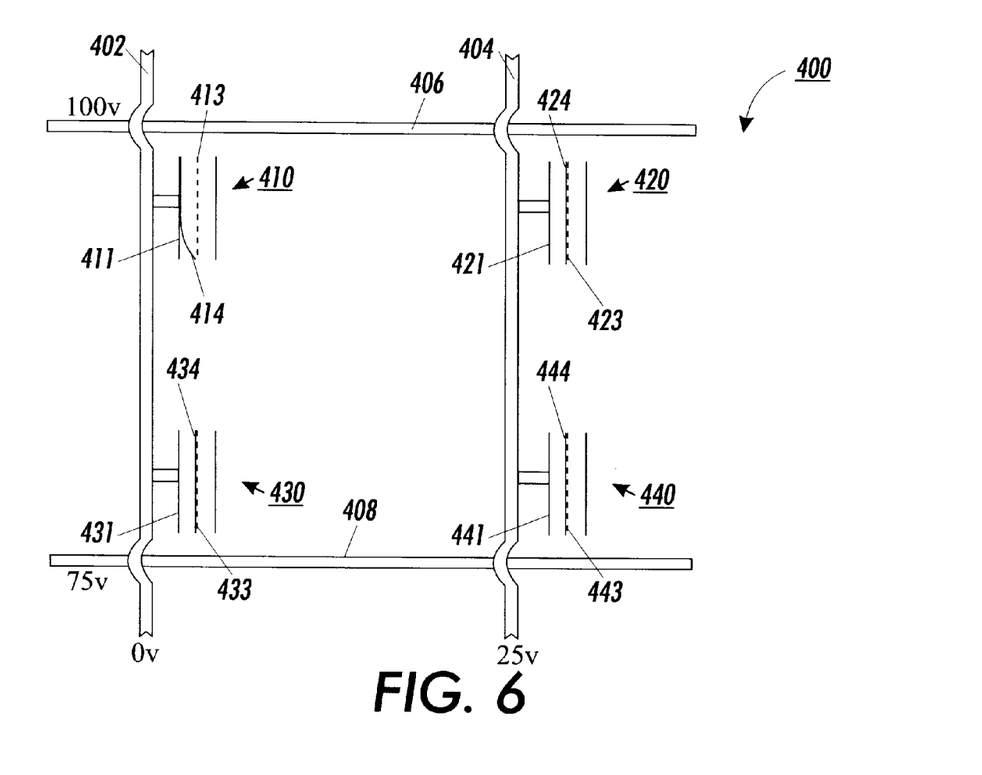
FIG. 6 is a schematic view illustrating voltage addressing of four valve sites, with one valve being switched while the remaining valves remain unswitched.

Switching operation through passive matrix addressing of arrays of valves having structures in accordance with the foregoing embodiments of the invention can best be seen with reference to FIG. 6. A four valve array 400 is schematically illustrated in FIG. 6, with four cantilever film valves 410, 420, 430, and 440 being controlled by voltage address lines. Each valve has identical structure, with an electrode plate (electrode plate 411, 421, 431 or 441). A cantilever film in a start position (non-blocking) before switching (film 413, 423, 433, or 443) is indicated in dotted line, while the after switching position is indicated in solid line(film 414, 424, 434, 444). Address line 402 is connected to plates 411 and 431, address line 404 is connected to plates 421 and 441 address line 406 is connected to cantilever films 413 and 423, and address line 408 is connected to cantilever films 433 and 443.

FIG. 6 illustrates the procedure for switching (closing to aperture blocking) valve 410 while leaving the remaining valves 420, 430, and 440 unswitched (open). Normally, all row (column) address lines are maintained at the same voltage (in this case 75 (25) volts) within the sustain voltage range, so the voltage differential between the movable film and the plate is too small to induce switching between non-blocking for open valves and too large to allow release for closed valves. To switch valve 410, voltage in row address line 406 is raised from 75 volts to 100 volts and voltage in column address line 402 is decreased from 25 volts to 0 volts. This leaves the final position 444 of the film unchanged in valve 440, since there is no voltage change at all. The final position 424 of the film in valve 420 is also unchanged. Even though the film voltage has been raised to 100 volts from its previous 75 volts, the voltage at plate 421 is still only 25 volts, not enough to induce electrostatic switching since the voltage differential (75 V) is below the switching threshold. Similarly, valve 430 remains unswitched, since the magnitude of the differential between the plate 431 and cantilever film 434 voltage at 431 is only 75 volts. However, the specifically addressed valve 410 will switch. In valve 410 the new voltage is 100 volts, enough to cause switching of the film to move from a neutral position of 413 to a new position 414. In a similar manner any valve which is initially blocking can be opened. As those skilled in the art will appreciate, various alternative voltage levels are possible, such as alternating signs of the voltage potential, as long as the voltage differential is adequate for switching. Note that this illustrative example can be extended to allow for passive matrix addressing of arbitrary valve elements in large valve arrays by simple voltage addressing.

Figure 7:
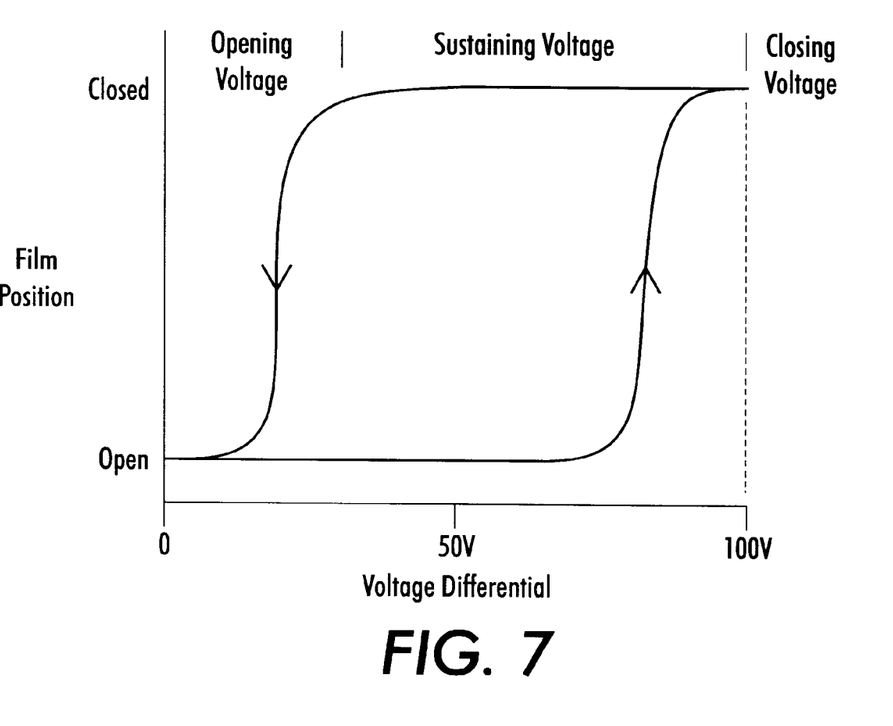
FIG. 7 illustrates the flexible film positions at varying voltage differentials.

FIG. 7 shows the position of flexible film 102 as varying voltages are applied between the electrode and the film. Between 80–90 Volts the value switches from open to closed and at 100 Volt differential, the film position is in the closed position.

Valve arrays controlling pressurized air jets as taught with respect to FIG. 6 can be used for handling objects, including flexible objects such as paper. For example, a processing system 110 optimized for handling objects without requiring direct physical contact, including sheets of paper 112, is partially illustrated in FIG. 8. The processing system 110 has a conveyor 120, divided into a lower section 122 and an upper section 124. For clarity, the upper section 124 is cut away to better illustrate paper movement, however, it will be appreciated that the upper section 124 and lower section 122 are substantially coextensive. The sections 122 and 124 are maintained in spaced apart relationship to define a passage 123 therebetween, with the passage sized to accommodate non-contacting passage therethrough of paper 112. Each section 122 and 124 has a plurality of independently or semi-independently controlled adjustable air jets 126 for dynamically supporting, moving, and guiding paper 112 through the system 110. At least some of these air jets 126 are controlled by valves in accordance with present invention, as exemplified with reference to those valve embodiments in FIGS. 1–6.

Figure 8:
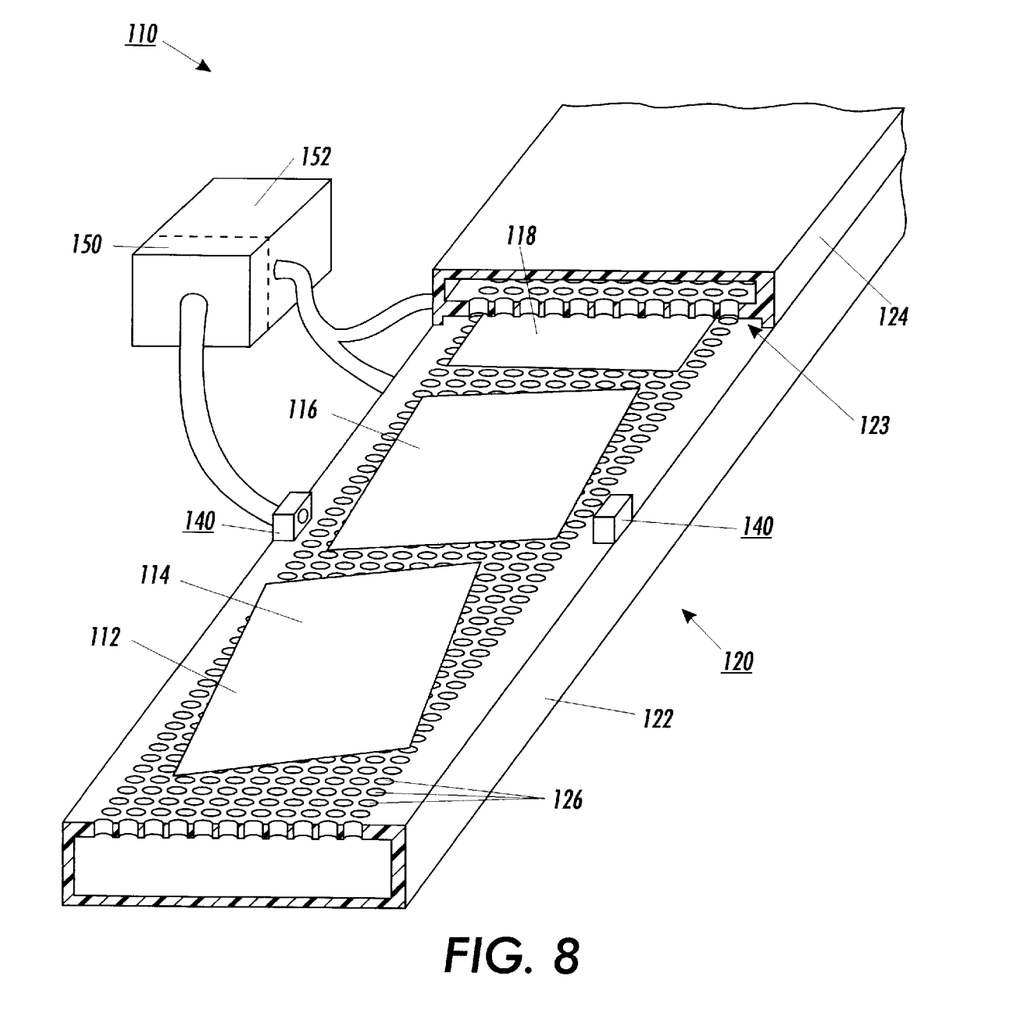
FIG. 8 illustrates a paper handling system for accurately moving air jet supported papers at high speeds using an array of valves in accordance with the present invention, with sensor units used to detect a paper, and a movement control unit connected to the sensor units to provide appropriate corrective input to air jets to maintain the paper on a desired path, velocity, and orientation.

Having opposed air jets in sections 122 and 124 permits adjustable application of air flow (by the directed air jets) to opposing sides of paper 112, dynamically holding the paper between sections 122 and 124, while allowing precise control of paper position, velocity, and orientation through application of vertical, lateral, or longitudinal forces (again by directed air jets). As an added advantage, the use of independent or semi-independent controlled adjustable air jets 126 allows for dynamically increasing or decreasing air flow directed against portions of paper 112, allowing straightening, flattening, curling, decurling, or other desired modification in paper topography, as well as adjustments to paper position, orientation and velocity. In addition, paper of various weights, sizes, and mechanical characteristics can be easily supported and accelerated by appropriate modification of the air flow applied by air jets 126. For example, a heavy, thick, and relatively inflexible cardboard type paper may require more air flow from the jets 126 for support and maneuvering, while a lightweight paper sheet may require less overall air flow, but may need quicker and more frequent air flow adjustments directed by the independent or semi-independent air jets 126 to compensate for flutter or edge curling effects.

Active flexible object guidance (of paper 112) to correct for flutter and other dynamic problems of flexible objects is enabled by provision of at least one sensing unit 140. The sensing unit 140 senses the motion state of paper 112, giving spatial and dynamic information (such as may be yielded from application of an optical imaging system or edge detection system) to a motion analysis unit 150 capable of calculating relative or absolute movement of paper 112 from the received information, with movement calculations generally providing overall position, orientation, velocity of paper 112, as well as position, orientation, and velocity of subregions of the paper 112 (due to flexure of the paper 112). Typically, the motion analysis unit 150 is a general purpose computer or dedicated hardware system capable of high speed image processing calculations necessary for determining object movement. Using this calculated movement information, a motion control unit 152 connected to the motion analysis unit 150 sends control signals to conveyor 120 to appropriately modify movement of paper 112 by selectively increasing or decreasing application of directed air jets to subregions of the paper 112 to reduce flutter, buckling, curling, or other undesired deviations from the desired motion state. As will be appreciated, use of discrete sensors, motion analysis units, and motion control units is not required, with integrated motion analysis and motion control assemblies being contemplated. In fact, it is even possible to provide a plurality of integrated sensors, motion analysis units, and motion control units as integrated microcontroller assemblies on the conveyor.

Whether the sensing unit 140 is discrete or integrated with microcontrollers, in order to ascertain object position properly the sensing unit 140 must be reliable and accurate, having a spatial and temporal resolution sufficient for tracking a relatively small area of the flexible object (typically at least about one square centimeter, although greater or lesser resolution is of course possible). Further, in many processes the object is moving quickly, allowing less than a 100 milliseconds for tracking measurements. Fortunately, optical sensors, video imaging systems, infrared or optical edge detectors, or certain other conventional detectors are capable of providing suitable spatial and temporal resolutions. For best results, two dimensional optical sensors (such as charge coupled devices (CCD's)), scanned one dimensional arrays, or continuous position sensitive detectors are utilized. However, fixed one dimensional sensor arrays can also be used. As will also be appreciated, contactless sensors other than optical sensors may be used, including but not limited to pressure sensors, acoustic sensors, or electrostatic sensors.

In operation, use of a sensing unit 140 for feedback control of object movement allows for precise micromanipulation of object motion state. For an illustrative example, in FIG. 8 paper 112 is sequentially illustrated in three distinct positions along conveyor 120, respectively labeled as paper position 114, paper position 116, and paper position 118. In position 114, the paper 112 arriving at the conveyor 120 is misaligned. As paper 112 is moved along conveyor 120 toward position 116 by air jets 126, the sensor 140 provides a time series of discrete spatial measurements that correspond to the instantaneous position of paper 112. These elements of a time series of spatial measurement information are continuously passed to the motion analysis unit 150. The motion analysis unit 150 uses the received information (i.e. the sensor measured one, two, or three dimensional spatial information) to accurately determine motion state of paper 112, including its position, velocity, and dynamics. This information (which may be collectively termed "trajectory") is passed to the motion control unit 152, which computes a corrective response to minimize error in trajectory and sends signals to selected air jets 126 to correct the misalignment, bringing the paper 112 closer to alignment as indicated by position 116. This feedback control process for properly orienting paper 112 by feedback controlled corrections to paper trajectory (the paper 112 now spatially located at position 116) is repeated, with the trajectory of paper 112 finally being correctly aligned as shown at position 118. As will be appreciated, this feedback control process for modifying the trajectory of flexible objects can be quickly repeated, with millisecond cycle times feasible if fast sensor, motion processing, and air jet systems are employed.

Advantageously, the present invention allows for manipulation and control of a wide variety of flexible objects and processes. In addition to paper handling, other flexible articles of manufacture, including extruded plastics, metallic foils, wires, fabrics, or even optical fibers can be moved in accurate three dimensional alignment. As will be appreciated, modifications in layout of conveyor 120 are contemplated, including but not limited to use of curved conveyors (with curvature either in a process direction or perpendicular to the process direction to allow for vertical or horizontal "switchbacks" or turns), use of cylindrical or other non-linear conveyors, or even use of segmented conveyors separated by regions that do not support air jets. In addition, it may be possible to construct the conveyer 120 from flexible materials, from modular components, or as interlocking segmented portions to allow for quick and convenient layout of the conveyor in a desired materials processing path.

The present invention permits ready detection and correction of trajectory, rotations, slight misalignments, three dimensional misalignments due to flutter, creases, edge turning, or other orientation problems that can be difficult to quickly detect and provide suitable movement compensation using standard material processing movement control systems. As will be appreciated by those skilled in the art, proper air jet construction and control is a critical aspect of the present invention. Typically, air jets must be constructed and positioned with respect to a flexible object to enable application of on the order of one millinewton of force to each side of the flexible object, with precise force values of course depending on material and dynamic properties of the flexible object, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course valve response times, controllers, motion analysis, and pressure conditions must also be such that air jet operation and control occurs on a millisecond time scale.

Figure 9:
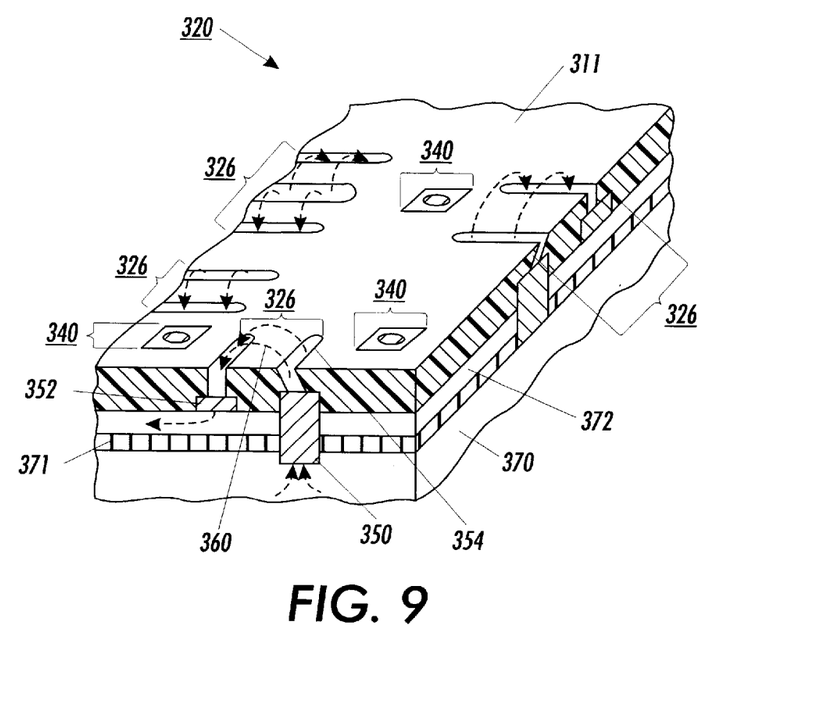
FIG. 9 is an exemplary illustration of a directed air jet system having valve controlled vertical, lateral, and longitudinal air jets, along with integrated sensor systems to enable accurate feedback controlled positioning of flexible objects in three dimensions.

A generic air jet architecture suitable for use in the present invention is illustrated with reference to FIG. 9. A portion of a flexible object conveyor 320 includes a variety of air jets 326 for enabling longitudinal, lateral, and vertical transport of flexible objects (flexible objects not shown for clarity). The air jets 326 include channels 354 defined in the conveyor surface 311 to allow exit or entrance of flowing air 360. For example, a single cantilever film type valve 350 (part of a two dimensional array of valves) in accordance with the present invention can be selectively operated by passive matrix addressing to permit high pressure air in plenum 370 to flow upward, impart momentum to flexible objects, and pass downward through valve 352 and into plenum 372. As shown in FIG. 8, plenum 372 is separated from plenum 370 by partition 371, with plenum 372 being maintained at a lower air pressure than plenum 370.

Control of flexible object path is enabled by provision of a plurality of integrated sensors 340, which can include, but are not limited to, optical, mechanical, thermal, electrostatic, or acoustic sensors. The sensors 340 are used to provide near continuous sensor feedback relating to object position, which in turn allows nearly continuous movement control of flexible objects passing adjacent to the air jets 326. As will be appreciated, information received from sensors 340 can be passed to a centralized motion analysis unit and motion control unit, such as described in connection with FIG. 7. Alternatively, distributed or local motion analysis and control can be employed. For example, sensors 340 can be integrated with computer microcircuitry capable of analyzing sensor input and directing control of air jets.

Figure 10:
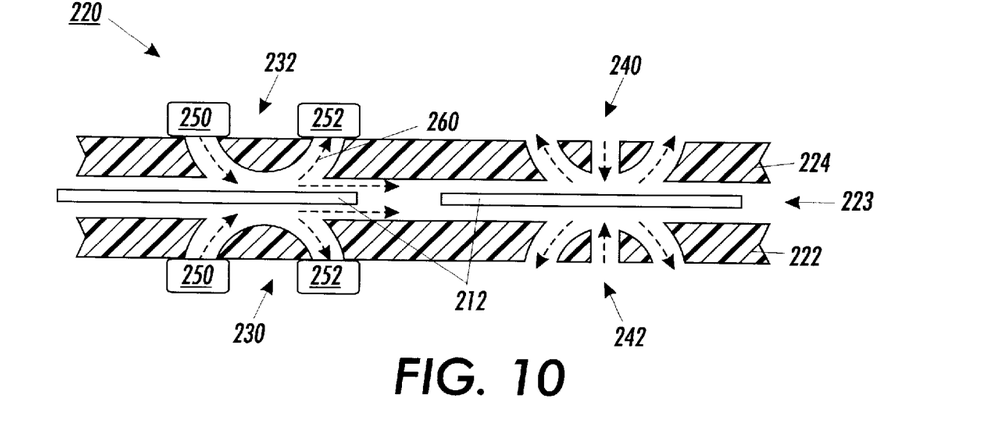
FIG. 10 is a cross section of a directed air system similar to that illustrated in FIG. 9, illustrating directed air flow patterns.

FIG. 10 is a side view of a flexible object conveyor 220 that is divided into a lower section 222 and a upper section 224, with a passage 223 therebetween, and each section 222 and 224 having a plurality of independently or semi-independently controlled adjustable air jets 126 for dynamically supporting, moving, and guiding paper 212 through the system. As previously explained in connection with FIG. 7, having opposed air jets in sections 222 and 224 permits adjustable application of air flow (by the directed air jets) to opposing sides of paper 212, dynamically holding the paper between sections 222 and 224, while allowing precise control of paper position, velocity, and orientation through application of vertical, lateral, or longitudinal forces (again by directed air jets). For example, longitudinal transport of paper 212 is encouraged by the combined action of air jets 230 and 232, positioned to oppose each other in respective sections 222 and 224. Air flow 260 is controlled by valves 250 and 252, with the air flow imparting longitudinally directed momentum to paper 212. As another example of controlling position of paper 212, opposed air jets 240 and 242 can be used to vertically direct air 260 to suspend paper 212 in a desired position in conveyor 220. This capability can even be extended to allow differential lateral or longitudinal tensioning of subregions of a piece of paper, permitting decurling, curling, reduction of flutter, or other desirable paper shaping effects.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

We claim:

1. A passively addressable array of valves comprising:

a plurality of valves defined by an aperture plate with a plurality of apertures therethrough and having an inner surface, and a port plate positioned in an opposed spaced apart relationship to the aperture plate, the port plate defining a plurality of ports therethrough and an inner surface, a plurality of conductive flexible films respectively attached to each of the plurality of valves, wherein each flexible film is attached to the valve at a first end thereof and free to move at a second end thereof, with each flexible film independently addressable to alternately switch between an aperture blocking position and an aperture open position, a switching voltage source for maintaining a subset of the plurality of valves at one of a non-addressed voltage and an address voltage, a plurality of switching electrodes, a switching electrode associated with each valve for applying an electrostatic switching force to move the plurality of flexible films, with only that subset of the plurality of valves having flexible films maintained at the address voltage switching between the aperture open position and the aperture blocking position, and a plurality of dielectric layers, each dielectric layer positioned between the switching electrodes and the flexible films to prevent shorting between the flexible films and the switching electrodes made by the process, comprising:

forming an aperture substrate;

forming a port substrate; and applying an adhesive layer to either the aperture substrate or the port substrate, and aligning the aperture substrate and the port substrate and bonding the aperture substrate and the port substrate together.

2. The array of passively addressable valves of claim 1 made by the process further comprising:

depositing and patterning an aperture metal layer into address lines and the plurality of films on the aperture substrate after producing the aperture substrate;

depositing and patterning a port metal layer to form the switching electrode after producing the port substrate; and depositing a dielectric insulation layer on the patterned port metal layer.

3. The passively addressable array of valves produced by the process of claim 2, further comprising:

forming holes in the films, the holes positioned around the portion of the films contacting the ports.

4. The passively addressable array of valves produced by the process of claim 2, further comprising:

depositing and patterning a release layer on the aperture substrate after depositing and patterning the aperture metal layer, and sacrificially removing the release layer after the aperture substrate and port substrate are bonded together.

5. The passively addressable array of valves produced by the process of claim 2, further comprising:

filling the aperture substrate with a polymer layer after producing the aperture substrate;

planarizing the polymer layer prior to depositing and patterning the aperture metal layer; and removing the polymer layer after the aperture substrate and port substrate are bonded together.

* * * * *

UNITED STATES PATENT AND TRADEMARK OFFICE
CERTIFICATE OF CORRECTION

| | |
|---|---|
| PATENT NO. | : 6,120,002 |
| APPLICATION NO. | : 09/481234 |
| DATED | : September 19, 2000 |
| INVENTOR(S) | : David K Biegelsen et al. |

Page 1 of 1

It is certified that error appears in the above-identified patent and that said Letters Patent is hereby corrected as shown below:

Column 1, line 6, insert as a new paragraph:

This invention was made with Government support under DABT63-95-C-0025 awarded by ARPA. The Government has certain rights in this invention.

Signed and Sealed this

Eleventh Day of March, 2008

JON W. DUDAS
*Director of the United States Patent and Trademark Office*